No. 671,565. Patented Apr. 9, 1901.
E. A. SCHUMACHER.
LATHE.
(Application filed Aug. 7, 1900.)
(No Model.) 3 Sheets—Sheet 1.
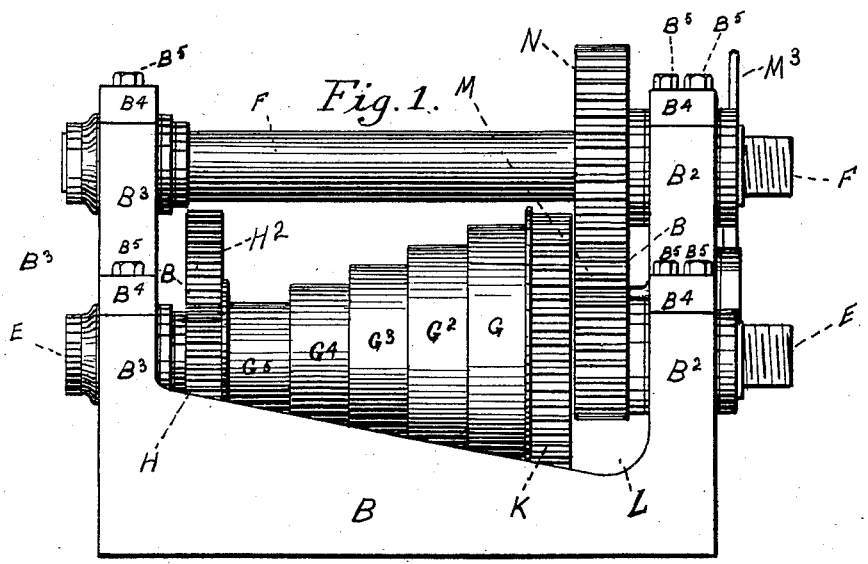
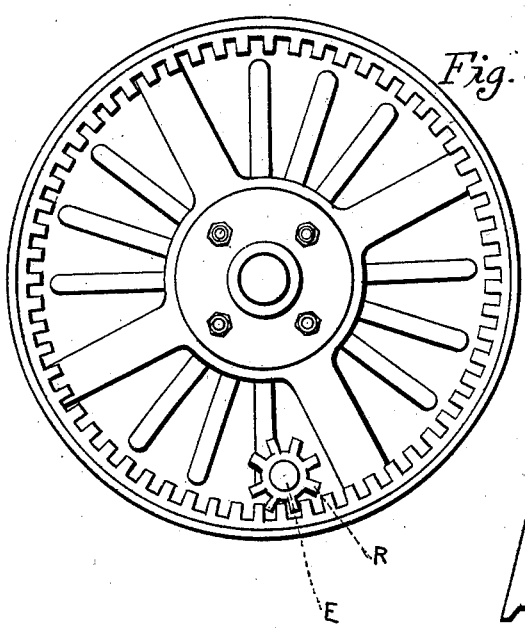
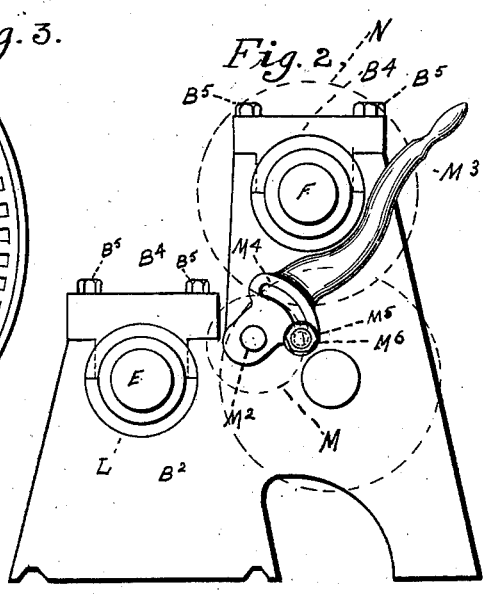
WITNESSES: INVENTOR.
Ernst A. Schumaker
BY
Wm. Hubbell Fisher
ATTORNEY.

No. 671,565. Patented Apr. 9, 1901.
E. A. SCHUMACHER.
LATHE.
(Application filed Aug. 7, 1900.)
(No Model.) 3 Sheets—Sheet 2.

WITNESSES:
Charles F. Spiegel.
N. Smith.

INVENTOR.
Ernst A. Schumacher
BY
Wm. Hubbell Fisher,
ATTORNEY.

THE NORRIS PETERS CO., PHOTO-LITHO., WASHINGTON, D. C.

No. 671,565. Patented Apr. 9, 1901.
E. A. SCHUMACHER.
LATHE.
(Application filed Aug. 7, 1900.)

(No Model.) 3 Sheets—Sheet 3.

WITNESSES:
Charles H. Spiegel
K. Smith

INVENTOR.
Ernst A. Schumacher
BY
Wm. Hubbell Fisher
ATTORNEY.

UNITED STATES PATENT OFFICE.

ERNST A. SCHUMACHER, OF CINCINNATI, OHIO.

LATHE.

SPECIFICATION forming part of Letters Patent No. 671,565, dated April 9, 1901.

Application filed August 7, 1900. Serial No. 26,187. (No model.)

*To all whom it may concern:*

Be it known that I, ERNST A. SCHUMACHER, a citizen of the United States, and a resident of the city of Cincinnati, in the county of Hamilton and State of Ohio, have invented certain new and useful Improvements in Lathes, of which the following is a specification.

My improvements relate to means for enlarging the capacity of the lathe, thereby enabling it to operate upon larger diameters than it could otherwise do.

The several features of my invention and the various advantages resulting from their use conjointly or otherwise will be apparent from the following description and claims.

Figure 4:
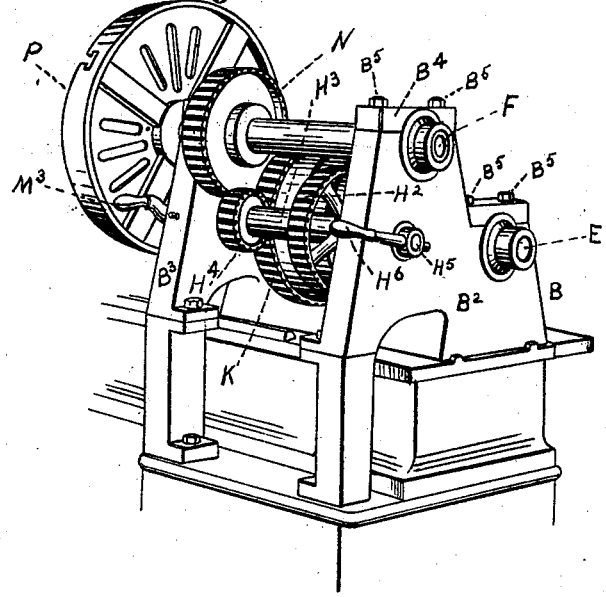
Figure 5:
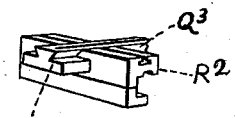
Figure 6:
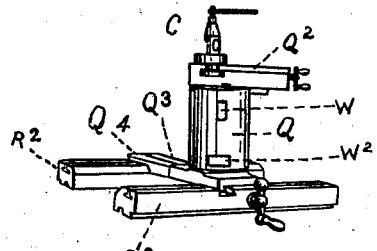
Figure 7:
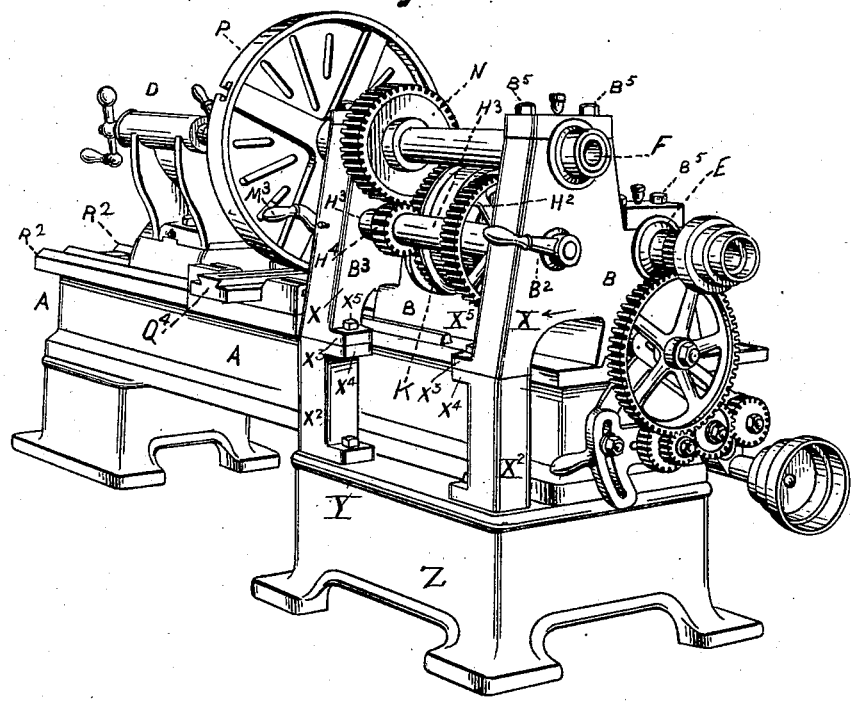

In the accompanying drawings, making a part of this application, and in which similar letters of reference indicate corresponding parts, Figure 1, Sheet 1, represents a front elevation of the head-stock. Fig. 2, Sheet 1, is a view of that side of this head-stock which faces toward the right hand in Fig. 1. Fig. 3, Sheet 1, is a view of the rear of the face-plate, showing internal gear. Fig. 4, Sheet 2, is a rear view in perspective of the head-stock, showing the rear side of it and also that end of it which faces toward the left in Fig. 1. Fig. 5, Sheet 2, is a rear view of a part of the compound carriage, showing the extension. Fig. 6, Sheet 2, is a perspective view of the compound carriage, showing the rising device, &c. Fig. 7, Sheet 3, is a front elevation of a lathe, illustrating my invention and the location and arrangement of the aforementioned constructions relative to themselves and to other portions of the lathe.

I will now proceed to describe my invention in detail.

A indicates the bed of the lathe.

B indicates in general the head-stock.

C indicates in general the sliding tool-rest, and D in the same manner the tail-stock.

The head-stock B is duly located on the bed A. The upright end supporting-pieces, respectively marked $B^2$ $B^3$ of this stock, carry the live-spindle E and the concomitant or upper spindle F, respectively journaled in these pieces $B^2$ and $B^3$ and secured in place by the caps $B^4$, held down by screws $B^5$. The live-spindle carries a set of cone-pulleys, (indicated by the characters G, $G^2$, $G^3$, $G^4$, and $G^5$.) Such cone-pulleys are well known and their functions are well understood. To the right of the cone-pulleys is a gear-wheel K, fixed on the live-spindle E. The latter operates in connection with what is known as the "back gear" when the latter is in use.

The mode of operating the lathe when employing the back gear and the mode of operating it when the use of the back gear is omitted will now be described.

The lathe is provided with reversible gear, to wit: On that end of the live-spindle which is at the left hand in Fig. 1—viz., next to the smallest cone-pulley—is pinion H. Behind the pinion H is the gear-wheel $H^2$, fixed on a shaft $H^3$, duly journaled in the head-stock. The pinion H engages this gear-wheel $H^2$. On the shaft $H^3$ and near its other end is fixed a gear-wheel $H^4$, concentric with the shaft and engaging the gear-wheel K aforementioned. It will be understood that the rotary power to drive the lathe is communicated to the latter through the cone-pulley. This cone-pulley and the pinion H are united together and turn as one. They can turn loosely on the live-spindle E, and thus rotate without rotating this spindle. It is the gear-wheel K that is always fixed on the live-spindle, and they always rotate together. There are well-known means provided for locking this gear-wheel K to this cone-pulley. When the cone-pulley is disconnected from the gear-wheel K, the pulleys rotate and through the agency of the pinion H rotate the gear-wheel $H^2$ and pinion $H^4$. The latter rotates gear-wheel K, and gear-wheel K turns the live-spindle E, and at the same time, of necessity, turns the pinion L. By this arrangement the speed of the revolution of the live-spindle is increased in the ratio of the relative proportions of the intermediate gear engaged. When it is desired to operate the live-spindle E at the original speed of the cone-pulley, then the gear-wheel K is locked to the cone-pulley and the back gear—viz., wheel $H^2$ and pinion $H^4$—are thrown out of engagement, the wheel $H^2$ being separated from the pinion H and the pinion $H^4$ from gear-wheel K. This is duly accomplished. In the present instance it is effected by eccentrics on a shaft $H^5$, extending through the shaft $H^3$, in the present instance tubular. The shaft $H^5$ is duly operated by the lever H⁶, whereby the wheel H² and pinion H⁴ are at will thrown into and out of engagement.

Upon the live-spindle E is fixed a pinion L, and upon the upper spindle F is located a gear-wheel N, its diameter bearing the relation to the diameter of the pinion L of a greater to a less. In the present illustrative instance the proportion is of two to one. Heretofore it has been customary to gear this pinion L directly into the gear-wheel N. I have found many objections to such a construction. To obviate these objections and attain very many advantages not obtainable by the devices as heretofore constructed, I have invented the following construction: Intermediate of pinion L and gear-wheel N, I locate a pinion M on a shaft M², journaled in the head-stock piece B². This shaft projects through the upright B² and at the right-hand side of piece B² (see Fig. 1) carries a lever-arm M³. This arm M³ is provided with a slot M⁴, curved in an arc concentric with the shaft M². Through this slot extends a stud M⁵, fixed at one end in the piece M² and at the other end portion has a screw-thread engaging a nut M⁶, which acts as a clamp and whereby the arm M³ when moved to the desired end of the stop can be set in that position. Thus when the free end of the lever is thrown downward, as shown in Fig. 2, the pinion L is thrown out of engagement with the pinion M and the live-spindle E can be used as in any ordinary lathe, or with the lever M³ in the same position the face-plate P (see Fig. 3) may be received on the shaft F and the pinion R on the live-spindle E. Then when the spindle E revolves it rotates the face-plate P by means of the pinion R.

Another mode of using this lathe is to use the large face-plate E without employing the pinion R. In such event the lever M³ is moved upward, bringing the pinion M into engagement with the pinion L and gear N, and thus employing said pinion as an intermediate gear. The nut M⁶ is employed to set the lever M³. So, also, by throwing the pinion M into engagement with the pinion L and gear-wheel N, I am enabled to perform a large number of advantageous operations, some of which include the live-spindle working below and the shaft or mandrel A² working above.

The pinion M may be varied in diameter, and so there may be a series of pinions M of various diameters, any one of which may be mounted on the shaft M², according to the speed at which it is desired that the spindle should rotate relatively to the live-spindle. Thus by means of the cone-spindle, the use or omission of the back gear, the intermediate pinion M, capable of being varied in diameter as mentioned, and the capacity of the lathe to bring the pinion L into engagement (by pinion M) with gear-wheel N, I have produced a lathe which affords a great range of feed and of screw-cutting and advantageous for other work. A minor advantage of this invention is also seen in its capacity for the ready omission of the use of the upper spindle when that is not needed, thereby saving the expenditure of power otherwise required to operate the same and also economizing in the wear and tear of the parts.

The use of the elevated spindle F necessitates an elevation of the tool-rest for enabling the tool to properly and effectively act upon the materials rotated by such spindle. I have improved the ordinary tool-rest and have enlarged its capacities as follows: In the compound carriage I employ a rising device, consisting of a cylindrical body Q, supporting and elevating the upper portion of the tool-rest Q² and itself resting on the transverse slide Q³, crossing the runways R² of the bed of the lathe and working through them. The slide is duly provided with the extension Q⁴, enabling the tool-rest to pass beyond the rear side of the lathe to duly operate upon large pieces rotated by the upper spindle.

The rising device Q may be connected to the parts Q² and Q³ in any suitable manner. The preferred mode consists in providing the upper end of the cylindrical device Q with a recess, which receives a projection from the bottom of the top slide, and in further providing the lower end with a projection received into a recess in the bottom slide Q³. These projections are indicated by dotted lines. The opening W in the device Q enables the bolt connecting the latter to the top slide to be inserted and otherwise manipulated. The opening W² in the device Q enables in like manner the device Q to be bolted to the bottom slide.

If such a combination as I have added to the lathe were to be added to a lathe having a frame of the ordinary and well-known construction, the lathe would be inoperative, for, among other reasons, because the frame would spring and the products of the lathe would be very imperfect. To avoid such imperfect production, I have devised a frame of a novel and useful construction, as follows: I widen the end supporting-pieces B² and B³, so that the edge of one side extends beyond the side of the bed A, as shown. These extended sides X X extend downwardly, as shown, in the form of legs X² at the side of the bed A and are supported by a shelf or extension Y, which extends out laterally, as shown, and is in the present illustrative instance a part of the leg or basal support Z. The legs X² may be in one piece with the head-stock ends X; but they are preferably made separate and bolted together. The latter construction is shown in the drawings, and the preferred manner of connection is shown—viz., the lugs X³ X⁴, respectively connected to the side X and the leg X² and connected by the bolts X⁵. The legs X² are also preferably separate from the side of the lathe-bed, as shown. The lower ends of the extensions X² are bolted or otherwise secured to the ledge or shelf Y. The leg Z is made wide, the better to support the shelf Y and the better to hold the machine steady and prevent any lateral oscillation or spring of the upper portions of the lathe.

In practice I form the shelf Y and the leg Z in one piece, as indicated in the drawings. It will be observed that these new features of construction permit the lathe-bed to be as narrow as heretofore, and this although the capacity of the machine for various productions, including those of large dimensions, is greatly increased.

The additional features for conferring stiffness and strength are comparatively inexpensive. They require what may be termed a "substantially minimum weight of metal" to secure the desired results.

Those parts of the lathe shown in Fig. 7 and not herein described consist of portions well known and of no importance in this description.

The advantages of my invention are obviously many and important and confer upon a lathe great additional effectiveness and much enlargement of capacity.

I wish it to be understood that the relative diameters of the gear-wheel N and the pinion L may be relatively changed within proper limits, thus conferring still greater scope and usefulness upon my invention.

What I claim as new and of my invention, and desire to secure by Letters Patent, is—

1. In a lathe, the head-stock provided with two spindles, the live-spindle below, and an upper spindle, the live-spindle carrying the pinion L, and the upper spindle the gear-wheel N, and an intermediate pinion M, adapted to engage both the pinion L, and the gear-wheel N, and at will, to be disengaged therefrom, and means for enabling the tool-rest to support the tool, at the desired location, to effectively operate on enlarged work rotated by the upper spindle, substantially as and for the purposes specified.

2. In a lathe, the head-stock provided with two spindles, the live-spindle E below, pinion L thereon, and an upper spindle F, and wheel N thereon, and an intermediate pinion M, mounted on shaft $M^2$ in the head-stock, and intermediate between wheels L and N, and the lever $M^3$ having an arcal slot $M^4$, a stud $M^5$ of the head-stock being present in said slot, and a nut $M^6$ on the stud, substantially as and for the purposes specified.

3. In a lathe, the head-stock having a live-spindle below carrying the cone-pulley, and a pinion H at rear of the cone-pulley fixed thereto, and pulleys K and L fixed on the live-spindle, and back gear, and an upper spindle F, having a gear-wheel N, all in combination with a pinion M intermediate between the two gears N and L, and mounted on shaft $M^2$ of the head-stock, lever $M^3$ having an arcal slot $M^4$, a stud $M^5$ of the head-stock located in said head-stock, and a nut $M^6$ on the stud for locking the lever, substantially as and for the purposes specified.

4. In a lathe, the combination of the head-stock, a live-spindle below, an upper spindle as F above, means for enabling the live-spindle to operate the upper spindle, substantially as described, the lathe-bed, the head-stock widened relatively thereto, and having downward extensions outside of the line of the lathe-bed, and a shelf or ledge for supporting these extensions, substantially as and for the purposes specified.

5. In a lathe, the combination of the head-stock, a live-spindle below, an upper spindle F above, means for enabling the live-spindle to operate the upper spindle, a lathe-bed, the head-stock widened relatively thereto, and having downward extensions at the side of the lathe-bed, and a table or ledge for supporting the latter and widened leg to support the lathe, and the downward extensions, substantially as and for the purposes specified.

6. In a lathe, the combination of the head-stock, a live-spindle below, an upper spindle, pinion L on the live-spindle, gear-wheel N on the upper spindle, an intermediate pinion M, adapted to engage both the pinion L and the gear-wheel N, and at will, to be disengaged therefrom, the head-stock parts $B^2$ and $B^3$ widened at X, downward extensions $X^2$, support Y and leg Z, substantially as and for the purposes specified.

ERNST A. SCHUMACHER.

In presence of—
WM. SALMON JOHNS,
K. SMITH.